(12) United States Patent
Arliguie et al.

(10) Patent No.: US 12,006,221 B2
(45) Date of Patent: Jun. 11, 2024

(54) DIRECT GRAPHENE TRANSFER AND GRAPHENE-BASED DEVICES

(71) Applicants: CORNING INCORPORATED, Corning, NY (US); Fundació Institut de Ciències Fotòniques (ICFO), Castelldefels (ES); Institució Catalana de Recerca i Estudis Avançats, Barcelona (ES)

(72) Inventors: Therese Francoise Arliguie, Corning, NY (US); Theresa Chang, Painted Post, NY (US); Miriam Marchena Martin-Francés, Barcelona (ES); Prantik Mazumder, Ithaca, NY (US); Valerio Pruneri, Castelldefels (ES); Frederic Christian Wagner, Lindley, NY (US)

(73) Assignee: Corning Incorporated, Corning, NY (US)

( * ) Notice: Subject to any disclaimer, the term of this patent is extended or adjusted under 35 U.S.C. 154(b) by 79 days.

(21) Appl. No.: 17/546,488

(22) Filed: Dec. 9, 2021

(65) Prior Publication Data
US 2022/0098043 A1 Mar. 31, 2022

Related U.S. Application Data

(62) Division of application No. 16/763,479, filed as application No. PCT/US2018/061518 on Nov. 16, 2018, now Pat. No. 11,214,491.
(Continued)

(51) Int. Cl.
*C01B 32/194* (2017.01)
*B05D 1/00* (2006.01)
*B05D 3/12* (2006.01)

(52) U.S. Cl.
CPC ............ *C01B 32/194* (2017.08); *B05D 1/005* (2013.01); *B05D 3/12* (2013.01); *B05D 2350/60* (2013.01);
(Continued)

(58) Field of Classification Search
CPC .................................................... C01B 32/194
See application file for complete search history.

(56) References Cited

U.S. PATENT DOCUMENTS

| 3,673,049 A | 6/1972 | Giffen et al. |
| 3,753,674 A | 8/1973 | Ohlberg et al. |

(Continued)

FOREIGN PATENT DOCUMENTS

| CN | 1693247 A | 11/2005 |
| CN | 103534216 A | 1/2014 |

(Continued)

OTHER PUBLICATIONS

ASTM C1499-09, "Standard Test Method for Monotonic Equibiaxial Flexural Strength of Advanced Ceramics at Ambient Temperature", 2013, 14 pages.
(Continued)

*Primary Examiner* — William D Young
(74) *Attorney, Agent, or Firm* — Svetlana Z. Short (57) ABSTRACT

A method of forming a functionalized device substrate is provided that includes the steps of: forming a conductive layer on a growth substrate; applying a polymeric layer to a device substrate, wherein a coupling agent couples the polymeric layer to the device substrate; coupling the polymeric layer to the conductive layer on the growth substrate; and peeling the growth substrate from the conductive layer.

17 Claims, 7 Drawing Sheets

Related U.S. Application Data (60) Provisional application No. 62/587,840, filed on Nov. 17, 2017.

(52) U.S. Cl.
CPC ...... *B05D 2505/50* (2013.01); *C01B 2204/22* (2013.01)

(56) References Cited

U.S. PATENT DOCUMENTS

| | | | |
|---|---|---|---|
| 4,214,886 A | 7/1980 | Shay et al. | |
| 5,071,796 A | 12/1991 | Jones et al. | |
| 5,438,223 A * | 8/1995 | Higashi | H05K 3/321 |
| | | | 257/734 |
| 7,666,511 B2 | 2/2010 | Ellison et al. | |
| 7,867,932 B2 | 1/2011 | Beall | |
| 8,916,013 B2 | 12/2014 | Hong et al. | |
| 9,039,886 B2 | 5/2015 | Gong et al. | |
| 9,137,892 B2 | 9/2015 | Bando et al. | |
| 9,296,638 B2 | 3/2016 | Lezzi et al. | |
| 10,150,699 B2 | 12/2018 | Baum et al. | |
| 2009/0069163 A1 | 3/2009 | Beall | |
| 2010/0028681 A1* | 2/2010 | Dai | B82Y 40/00 |
| | | | 252/301.16 |
| 2010/0035038 A1 | 2/2010 | Barefoot et al. | |
| 2010/0084016 A1 | 4/2010 | Aitken et al. | |
| 2011/0057168 A1* | 3/2011 | Kobayashi | H01L 29/7781 |
| | | | 977/936 |
| 2011/0200804 A1 | 8/2011 | Tomamoto et al. | |
| 2013/0266501 A1* | 10/2013 | He | B82Y 40/00 |
| | | | 977/734 |
| 2014/0141217 A1 | 5/2014 | Gulati et al. | |
| 2014/0218867 A1 | 8/2014 | Kim et al. | |
| 2014/0242391 A1 | 8/2014 | Ono et al. | |
| 2015/0030827 A1 | 1/2015 | Gomez et al. | |
| 2015/0037552 A1 | 2/2015 | Mauro | |
| 2015/0166401 A1 | 6/2015 | Yamamoto | |
| 2015/0240038 A1 | 8/2015 | Macedo et al. | |
| 2015/0368153 A1 | 12/2015 | Pesansky et al. | |
| 2016/0304352 A1 | 10/2016 | Fernandez et al. | |
| 2017/0361574 A1 | 12/2017 | Kiczenski et al. | |
| 2018/0304588 A1 | 10/2018 | Harris et al. | |
| 2019/0030861 A1 | 1/2019 | Bellman et al. | |
| 2019/0391337 A1 | 12/2019 | Sato | |

FOREIGN PATENT DOCUMENTS

| | | |
|---|---|---|
| EP | 0413254 A1 | 2/1991 |
| JP | 61-141756 | 6/1986 |
| JP | 06-336533 A | 12/1994 |
| JP | 2001-180967 A | 7/2001 |
| JP | 4951838 B2 | 6/2012 |
| JP | 2012-232882 A | 11/2012 |
| WO | 01/34531 A1 | 5/2001 |
| WO | 2008/143999 A1 | 11/2008 |
| WO | 2013/016157 A1 | 1/2013 |
| WO | 2016/057590 A1 | 4/2016 |
| WO | 2016/094262 A1 | 6/2016 |
| WO | 2017/139552 A1 | 8/2017 |
| WO | 2021/025981 A1 | 2/2021 |

OTHER PUBLICATIONS

ASTM C158-02, "Standard Test Methods for Strength of Glass by Flexure" (Determination of Modulus of Rupture), 2012, 9 pages.
Barsom; "Fracture of Tempered Glass"; J. Am. Ceram. Soc., 51[2] 75-78 (1968).
Gardon; "Thermal Tempering of Glass"; pp. 146-216 in Glass: Science and Technology, vol. 5, Elasticity and Strentth in Glasses, Ed. By D.R. Uhlmann and N.J. Kreidl, Academic Press, New York, 1980.
Gulati, "Frangibility of Tempered Soda-Lime Glass Sheet," pp. 13-15 in Glass Performance Days, 1997.
Guo, Xiaoju et al. "Unified approach for determining the enthalpic fictive temperature of glasses with arbitrary thermal history" Journal of Non-Crystalline Solids, vol. 357, 2011, pp. 3230-3236.
Luo et al., "Competing Indentation Deformation Mechanisms in Glass Using Different Strengthening Methods", Frontiers in Materials, vol. 3, No. 52, 2016, 11 pages.
Morey; "The Effect of Boric Oxide on the Devitrification of the Soda-Lime-Silica Glasses. The Quaternary System, Na2O—CaO—B2O3—SiO2"; Journal of the Amercian Ceramic Society; vol. 15, Issue 9; pp. 457-475 (1932).
Narayanaswamy; "Stress and Structural Relaxation in Tempering Glass," J. Am. Ceram. Soc., 61[3-4] 146-152 (1978).
Ohlberg et al; "Thermal Stress Calculations Based on a Linear Viscoelastic Deviatoric Response and a Fictive Temperature Component for the Volumetric Response," Journal of Non-Crystalline Solids, 14 280-286 (1974).
Timoshenko et al; "Theory of Elasticity"; 2nd Ed; p. 146. McGraw-Hill Book Co., New York, 1951.
Chen, et al., "Nanopatterned Graphene on a Polymer Substrate by a Direct Peel-off Technique", ACS Appl. Mater. Interfaces, vol. 7, Issue 10, 2015, pp. 5938-5943.
Choi et al., "Influence of removing PMMA residues on surface of CVD graphene using a contact-mode atomic force Microscope" RSC Adv., vol. 7, 2017, pp. 6943-6949.
Gammelgaard et al., "Graphene transport properties upon exposure to PMMA processing and heat treatments", 2D Materials, vol. 1, 2014, 035005, 12 pages.
International Search Report and Written Opinion of the International Searching Authority; PCT/US2018/061518; dated Mar. 4, 2019; 19 Pages; European Patent Office.
Lin et al., "Graphene annealing: how clean can it be?", Nano Lett., vol. 12, Issue 1, 2012, pp. 414-419.

* cited by examiner

DIRECT GRAPHENE TRANSFER AND GRAPHENE-BASED DEVICES

CROSS-REFERENCE TO RELATED APPLICATIONS

This application is a divisional of U.S. patent application Ser. No. 16/763,479 filed on May 12, 2020, which claims the benefit of priority under 35 U.S.C. § 371 of International Application No. PCT/US18/61518, filed on Nov. 16, 2018, which claims the benefit of priority of U.S. Provisional Application Ser. No. 62/587,840 filed on Nov. 17, 2017 the contents of which are relied upon and incorporated herein by reference in their entirety as if fully set forth below.

FIELD OF THE DISCLOSURE

The present disclosure generally relates to the formation and transfer of graphene layers, and more specifically, to methods of forming a functionalized device substrate through the transfer of graphene layers.

BACKGROUND

Graphene, a two-dimensional monolayer of $sp^2$-bonded carbon atoms, has been attracting great interest following its isolation by the mechanical cleavage of graphite. Its unique physical properties, such as high intrinsic carrier mobility, tunable band gap, high mechanical strength and elasticity, and superior thermal conductivity, make graphene promising for many applications, including high-speed transistors, energy/thermal management, and chemical/biological sensors. As the current generation of silicon-based electronic and electronic devices reaches their fundamental minimum size limit in the coming years, graphene provides an opportunity to enable even smaller devices. Since graphene remains conductive and stable at the molecular level, it has the potential to provide the next generation of low-power electronics.

Since the first isolation of graphene by mechanical exfoliation, various methods have been devised to produce graphene. For the outstanding properties of graphene to be fully utilized, the synthesized graphene must be transferable to a variety of substrates. Particularly, in order for electrical current to flow through graphene devices as opposed to being shorted out by a conducting substrate, graphene must be removed from a conducting catalyst surface on which it is formed and transferred onto an insulating surface.

Various methods have been developed to transfer graphene onto different substrates. Currently, the most commonly used transfer methods rely on polymer-assisted transfer processes in which a polymer layer such as polymethyl methacrylate (PMMA) or a thermal release tape (TRT) is used as a temporary or intermediate substrate. In the PMMA route, PMMA is spin-coated on Gr/Cu (graphene on copper) followed by liquid-phase etching of the copper. The free-standing PMMA/Gr layer is carefully picked from the liquid and placed on a substrate of choice (e.g., glass or silicon) with the graphene in contact with the substrate. The PMMA is subsequently removed by chemical etching. In the TRT route, the tape is attached to the Gr/Cu followed by etching of the copper which leads to a free-standing TRT/Gr film. The TRT/Gr film is pressed to the substrate of choice followed by removal of the tape by increasing the temperature. While both methods lead to the transfer of graphene to a substrate, the top surface of the graphene from which the PMMA or TRT was removed, always retains some residual polymer fragments. Since the subsequent devices are made on this side of the graphene, the residual contaminants negatively impact the device performance. In fact, the contamination due to the polymer-transfer process is considered one of the major obstacles to achieving high-performance device quality.

Accordingly, new methods of graphene transfer which minimize and/or eliminate defects in the graphene associated with the transfer process may be advantageous (e.g., in the development of graphene-based electronic and electronic devices).

SUMMARY OF THE DISCLOSURE

According to at least one feature of the present disclosure, a method of forming a functionalized device substrate is provided that includes the steps of: forming a conductive layer on a growth substrate; applying a polymeric layer to a device substrate, wherein a coupling agent couples the polymeric layer to the device substrate; coupling the polymeric layer to the conductive layer on the growth substrate; and peeling the growth substrate from the conductive layer.

According to another feature of the present disclosure, a method of forming a functionalized device substrate is provided that includes the steps of: forming a graphene layer on a growth substrate; applying a polyimide layer to a glass, glass-ceramic or ceramic substrate, wherein a coupling agent couples the polyimide layer to the glass, glass-ceramic or ceramic substrate; coupling the polyimide layer to the graphene layer on the growth substrate; and peeling the growth substrate from the graphene layer.

According to another feature of the present disclosure, a functionalized device substrate includes a substrate defining a surface. A polyimide layer is disposed over the surface of the substrate. An aminosilane couples the polyimide layer to the surface. A graphene layer is coupled to the polyimide layer. The graphene layer has a sheet resistance of from about 100 Ohm/sq to about 30 kOhm/sq.

These and other features, advantages, and objects of the present disclosure will be further understood and appreciated by those skilled in the art by reference to the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Figure 1:
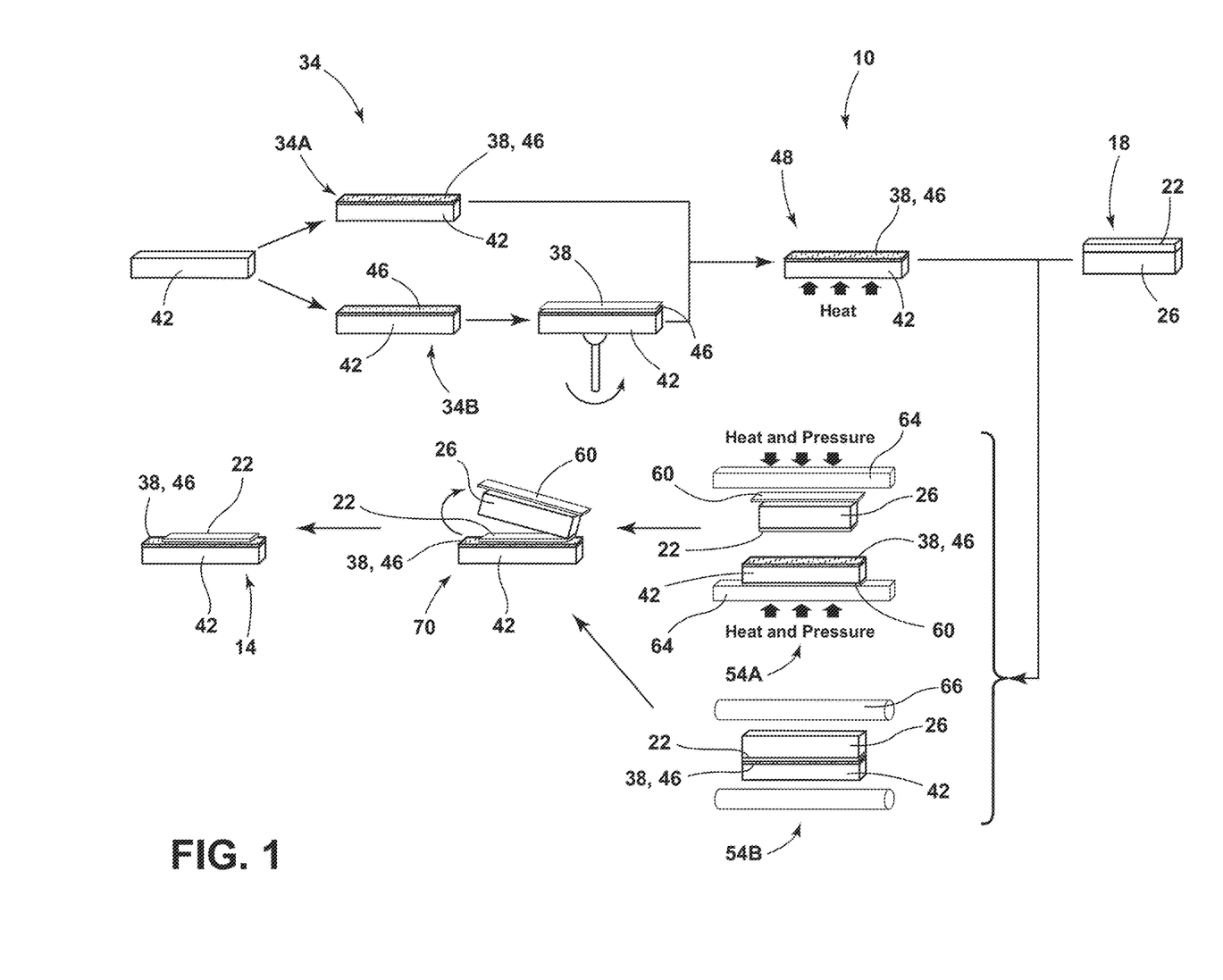
FIG. 1 is a schematic overview of a graphene forming transfer process, according to at least one example.

Referring now to FIG. 1, depicted schematically is a process 10 for the formation of a functionalized device substrate 14. The device substrate 14 may be a component of a mobile communication device (e.g., a cellular phone), an augmented reality device, an instrument, a vehicle, a display and/or other electronic components. The process 10 may begin with a step 18 of forming a conductive layer 22 on a growth substrate 26. The growth substrate 26 may be composed of a variety of materials configured to support and/or encourage the growth of the conductive layer 22. According to various examples, the growth substrate 26 may include one or more of nickel, copper, silicon carbide, germanium, silver, iron, stainless steel, sapphire, platinum, iridium, ruthenium, cobalt and copper-nickel alloys, semiconductor materials (e.g., silicon), other materials capable of supporting and/or growing the conductive layer 22 and/or combinations thereof. According to various examples, the growth substrate 26 may be a relatively thin substrate (e.g., a foil) having a thickness in the range of about 0.01 mm to about 1.0 mm. As will be explained in greater detail below, the process 10 involves the direct transfer of the conductive layer 22 from the growth substrate 26 to another substrate by pulling or peeling the conductive layer 22 from the growth substrate 26.

The conductive layer 22 may be composed of a variety of materials configured to transmit electrical and/or thermal energy. According to various examples, the conductive layer 22 may be composed of one or more layers of graphene. Graphene is a two-dimensional monolayer of $sp^2$-bonded carbon atoms. The graphene examples of the conductive layer 22 may include contiguous or non-contiguous layers of graphene. It will be understood that although described in connection with graphene, the process 10 may be used with a variety of conductive layers 22 (e.g., metals and/or semiconductors) generated on growth substrates 26. Further, the process 10 may also be utilized for the direct transfer of non-conductive thin films generated on the growth substrate 26.

Step 18 of forming the conductive layer 22 on the growth substrate 26 may be performed in a variety of manners. According to various examples, the graphene conductive layer 22 may be formed on the growth substrate 26 via a chemical vapor deposition process onto a growth substrate 26 comprising a metal (e.g., copper). Chemical vapor deposition of graphene involves the adsorption, decomposition and segregation of a carbon-containing precursor on a transition metal surface (e.g., the growth substrate 26) at elevated temperature and at either low or atmospheric pressure. For example, single layer and double layer graphene may be prepared in a vacuum chemical vapor deposition process from hydrocarbon precursors. In such an example, the growth substrate 26 is electrically conductive and the growth of the graphene conductive layer 22 can be carried out by exposing the metallic-containing growth substrate 26 to a carbon precursor such as $C_2H_2$, $CH_4$ or another hydrocarbon in conjunction with a reducing agent such as $H_2$ at elevated temperature. A graphene-formation temperature can be at from about 200° C. to about 1200° C. For example, the graphene formation may be carried out at a temperature of about 400° C., 500° C., 600° C., 700° C., 800° C., 900° C., 1000° C., 1100° C., and all temperatures therebetween. In some examples, graphene can be synthesized on the growth substrate 26 by cooling the substrate to a temperature below about 100° C. (e.g., to about room temperature).

According to yet another example of step 18, a conductive layer 22 including graphene may be formed on a metallic underlayer (e.g., cobalt or nickel) deposited on a semiconductor substrate. As such, the growth substrate 26 may be composed of both the metal and the semiconductor. The semiconductor substrate is placed within a chemical vapor deposition chamber and the substrate is heated to a processing temperature of about 450° C. or less. A carbon precursor flows into the chamber and graphene is synthesized. In some examples, graphene is synthesized by allowing the substrate to cool to a temperature below 100° C., subjecting the substrate to a room temperature process, and/or subjecting the substrate to ultraviolet light.

According to various examples, step 18 may further include a step applying a liquid to the conductive layer 22 and the growth substrate 26. The liquid may include water and/or other materials configured to ease in the delamination of the conductive layer 22 from the growth substrate 26. The liquid may have a temperature of about 40° C., or about 42° C., or about 44° C., or about 46° C., or about 48° C., or about 50° C., or about 52° C., or about 54° C., or about 56° C., or about 58° C., or about 60° C., or about 62° C., or about 64° C., or about 66° C., or about 68° C., or about 70° C., or about 72° C., or about 74° C., or about 76° C., or about 78° C., or about 80° C. or any and all values and ranges between the given values. The liquid may be sprayed or dip coated onto the conductive layer 22 and/or the growth substrate 26. The liquid may be applied to the conductive layer 22 and/or the growth substrate 26 for a time period of from about 1 minute to about 20 minutes, or about 5 minutes to about 10 minutes or any and all values and ranges therebetween. Without being bound by theory, it is believed that molecules of the liquid permeate the interface between the conductive layer 22 and the growth substrate 26 and result in the partial delamination of the conductive layer 22 from the growth substrate 26. Use of the solution on the conductive layer 22 and/or the growth substrate 26 may be advantageous in decreasing the force needed for delaminating the conductive layer 22 from the growth substrate 26 as explained in greater detail below. Such a feature may be advantageous in decreasing a risk of damaging the conductive layer 22 during removal from the growth substrate 26.

Next, a step 34 of applying a polymeric layer 38 to a device substrate 42 is performed. The device substrate 42 may be composed of a silicon wafer, glass, glass-ceramic, ceramic, crystalline (e.g., silicon crystalline) material, metal, polymeric material and/or combinations thereof. In polymeric material examples, the device substrate 42 may be composed of polyethylene terephthalate (PET). According to various examples, the device substrate 42 may include one or more of an aluminosilicate and/or a borosilicate glass. In various examples, the glass, glass-ceramic, ceramic device substrate 42 may be strengthened. For example, the device substrate 42 may have undergone one or more thermal, chemical, or physical strengthening steps. In thermal strengthening, the device substrate 42 may have been heat treated, annealed, tempered, or otherwise altered via the application of heat to strengthen the device substrate 42. In chemical strengthening examples, the device substrate 42 may have undergone one or more chemical exchanges (e.g., alkali metal exchanges) to create one or more strengthened regions (e.g., at a surface) in the device substrate 42. In physical strengthening examples, the device substrate 42 may be ground, polished or otherwise altered to reduce and/or eliminate flaws which may initiate crack propagation.

As used herein, the polymeric layer 38 may refer to both a mixture of precursor and solvent and/or a polymerized layer of the precursor. The polymeric layer 38 may be composed of polyimide, polythiophene and/or other polymers having a high surface energy and capable of bonding well with the conductive layer 22. According to various examples, the polymeric layer 38 may be composed of a polymer configured to have a high bond energy with graphene. Further, the polymeric layer 38 may have a higher bond energy with the conductive layer 22 than exists between the conductive layer 22 and the growth substrate 26. Polyimide is a polymer of imide monomers. Precursors to the polyimide examples of the polymeric layer 38 may include a dianhydride and a diamine and/or dianhydride and a diisocyanate. The dianhydrides used as precursors may include pyromellitic dianhydride, benzoquinonetetracarboxylic dianhydride and/or naphthalene tetracarboxylic dianhydride. Common diamine building blocks include 4,4'-diaminodiphenyl ether (DAPE), meta-phenylenediamine (MDA), and 3,3-diaminodiphenylmethane. As will be explained in greater detail below, the polymeric layer 38 may be used to peel the conductive layer 22 from the growth substrate 26 because of the greater bond between the polymeric layer 38 and the conductive layer 22 as compared to the bond between the conductive layer 22 and the growth substrate 26.

According to various examples, one or more coupling agents 46 may couple the polymeric layer 38 to the substrate 42. It will be understood that the polymeric layer 38 may also incorporate the coupling agent 46. For the process 10 to be successful in pulling or peeling the conductive layer 22 from the growth substrate 26, the bond energy between the device substrate 42 and the polymeric layer 38 as well as the bond energy between the polymeric layer 38 and the conductive layer 22 must be greater than the bond energy between the conductive layer 22 and the growth substrate 26. According to various examples, the coupling agent 46 may increase the adhesion between the polymeric layer 38 and the device substrate 42 by creating a surface functionalization of the substrate 42. In such examples, the coupling agent 46 may include an aminosilane. Aminosilanes may have the basic structure of RnSi(OR)4-n with "R" being an alkyl, aryl, or organofunctional group and "OR" being a methoxy, ethoxy, or acetoxy group. Exemplary aminosilane materials which may be used as the coupling agent 46 may include aminosilane (3-aminopropyltrimethoxysilane), aminopropyl-tri(ethoxy)silane, N-aminoethyl-aminopropyl-tri(ethoxy)silane, epoxysilane coupling agents such as glycidoxypropyl-tri(methoxy)silane, glycidoxypropyl-tri(ethoxy)silane, (3,4-epoxycyclohexyl)ethyl-tri(methoxy) silane and (3,4-epoxycyclohexyl)ethyl-tri(ethoxy)silane, isocyanate silane coupling agents such as isocyanate propyl-tri(ethoxy) silane and isocyanate propyl-tri(methoxy)silane, and mercaptosilanes such as mercaptopropyl-tri(methoxy)silane and mercaptopropyl-tri(ethoxy)silane.

The coupling agent 46 may be used in step 34 of the process 10 in a number of manners. In a first example of step 34, labeled 34A, the coupling agent 46 may be mixed into a precursor/solvent mixture of the polymeric layer 38. In such an example, a predetermined amount of the coupling agent 46 may be added to the precursor mixture of the polymeric layer 38. As explained above, the precursor mixture of the polymeric layer 38 may include both polymer layer 38 precursors and solvents. The coupling agent 46 may be added in an amount ranging from about 0.1% wt. to about 10% wt. into the precursor mixture of the polymeric layer 38. As such, the coupling agent 46 (e.g., the aminosilane) is disposed and/or dispersed within the polymeric layer 38 (e.g., polyimide layer). The mixture of coupling agent 46 and precursor mixture of the polymeric layer 38 may be vigorously stirred until the solution is completely miscible. In such an example, the coupling agent 46 and the polymeric layer 38 may form a single layer. The coupling agent 46 and precursor mixture of the polymeric layer 38 may then be applied to the device substrate 42 via spray coating, spin coating, dip coating, slot or die coating and/or other methods of coating solutions to substrates. The coupling agent 46 may work to functionalize the surface of the device substrate 42 such that the polymeric layer 38 is bonded to the device substrate 42.

In a second example of step 34, labeled 34B, the coupling agent 46 may be directly applied to a surface of the substrate 42. In such an example, the coupling agent 46 may be applied separately from the polymeric layer 38 such that the coupling agent 46 and the polymeric layer 38 form separate layers. The coupling agent 46 may be applied to the device substrate 42 via vapor deposition, deposition via aqueous alcohol, deposition via aqueous solution, spray deposition and/or other methods of applying the coupling agent 46. After the coupling agent 46 has been deposited on the substrate 42, the polymeric layer 38 precursor mixture may be disposed over the coupling agent 46 in any of the manners described above in connection with step 34A. In other words, the polymeric layer 38 may be applied to the coupling agent 46.

Regardless of whether example 34A or 34B of step 34 is used, once the precursor mixture of the polymeric layer 38 is applied to the device substrate 42, and the device substrate 42 is spun such that a desired polymeric layer 38 thickness is achieved. In other words, the polymeric layer 38 is spin coated onto the device substrate 42. In example 34A, both the coupling agent 46 and the polymeric layer 38 are spin coated to provide a desired thickness, while in example 34B the polymeric layer 38 is applied to the coupling agent 46 and then spin coated. The spin coating of the polymeric layer 38 may be performed in the range from about 2000 RPM to about 4000 RPM, or at about 3000 RPM for a period of time ranging from about 0.1 minute to about 2 minutes or for about 1 minute.

Once the polymeric layer 38 has been spin coated to the desired thickness, a step 48 of annealing the substrate 42, polymeric layer 38 and coupling agent 46 may be performed. The substrate 42, polymeric layer 38 and coupling agent 46 may be placed in an annealing oven at a temperature of from about 40° C. to about 80° C. for about 15 minutes to partially dry and/or polymerize the polymeric layer 38. Further, after annealing, the polymeric layer 38 may be inspected in order to identify possible artifacts/defects on the surface as a consequence of dust and/or gas bubbles.

Once the coupling agent 46 and the polymeric layer 38 have been applied to the substrate 42 via step 84, and annealed in step 48 in some cases, a step 54 of coupling the polymeric layer 38 to the conductive layer 22 is performed. Prior to coupling, the conductive layer 22 and/or growth substrate 26 may be pre-cleaned (e.g., rinsing with acetone and/or isopropanol) to ensure a good adhesion between the conductive layer 22 and the polymeric layer 38 such that holes in the conductive layer 22 do not develop. According to various examples, the coupling of the polymeric layer 38 and the conductive layer 22 is performed under heat and/or pressure. In such an example, the coupling of the polymeric layer 38 and the conductive layer 22 may be carried out through the use of a hot press and/or a laminator. The use of the heat and pressure while coupling the polymeric layer 38 and the conductive layer 22 may partially, substantially or fully cure the polymeric layer 38 while in contact with the conductive layer 22. In hot press examples of step 54, one or more polymeric slides 60 (e.g., polyethylene terephthalate) may be placed in contact with the device substrate 42 and growth substrate 26. Then, the growth substrate 26, the conductive layer 22, the polymeric layer 38 and the device substrate 42 (e.g., with the conductive layer 22 and the polymeric layer 38 in contact) are inserted between two silicone rubber sheets 64. The flexibility of the polymeric slides 60 will enhance the contact between the growth substrate 26 and the silicone rubber sheets 64 while at the same time absorbing part of the volatiles from the precursor mixture of the polymer layer 38 precursor (during the curing at temperature).

During hot press examples of step 54, labeled 54A, the polymeric layer 38 and/or device substrate 42 may be heated to a temperature in the range of about 50° C. to about 200° C., or about 90° C. to about 180° C., or about 90° C. to about 130° C. For example, the polymeric layer 38 may be heated to a temperature of about 50° C., 60° C., 70° C., 80° C., 90° C., 100° C., 110° C., 120° C., 130° C., 140° C., 150° C., 160° C., 170° C., and all temperatures between these temperature levels. It will be understood that the conductive layer 22 and/or growth substrate 26 may be heated to the same or a different temperature. The temperature of the hot press may be hot enough to cure the precursors of the polymeric layer 38 into a solid polymeric material. Such a curing of the polymeric layer 38 allows for an adhesion between the polymeric layer 38 and the conductive layer 22.

During laminator examples of step 54, labeled 54B, the polymeric layer 38 and/or device substrate 42 are passed through a laminator having rollers 66 with desired roller speed, distance between the rollers 66 and temperature. The temperature of the rollers 66 may be in the range of from about 50° C. to about 200° C., or from about 100° C. to about 170° C., or from about 120° C. to about 150° C. It will be understood that the conductive layer 22 and/or growth substrate 26 may be heated to the same or a different temperature. The temperature of the rollers 66 may be hot enough to cure the precursors of the polymeric layer 38 into a solid polymeric material. Such a curing of the polymeric layer 38 allows for an adhesion between the polymeric layer 38 and the conductive layer 22.

In addition to heating the polymeric layer 38 and/or the conductive layer 22, the polymeric layer 38 and the conductive layer 22 may be coupled in step 54A and/or step 54B under pressure. For example, the polymeric layer 38 and the conductive layer 22 may be pressed together with a pressure in the range of about 100 psi to about 500 psi, or from about 200 psi to about 400 psi. In specific examples, the polymeric layer 38 and the conductive layer 22 may be pressed together with a pressure of about 250 psi to about 350 psi. For laminator examples of step 54, the distance or spacing between the rollers 66 is altered (e.g., to about 2 mm or less spacing) to provide pressure (i.e., the same and/or similar pressures as the hot press). Coupling and curing the polymeric layer 38 to the conductive layer 22 under pressure may be advantageous in increasing bonding between the polymeric layer 38 and the conductive layer 22 while not degrading the conductive layer 22.

After a predetermined period of coupling time (or number of lamination cycles for the laminator) in step 54 under pressure and/or elevated temperature, the growth substrate 26 and the device substrate 42 are removed from the hot press. Once removed, a step 70 of peeling the growth substrate 26 from the conductive layer 22 is performed. Put another way, the conductive layer 22 is peeled from the growth substrate 26. The polymeric layer 38 and the conductive layer 22 detach from the growth substrate 26 and remain attached to the device substrate 42 owing to the fact that the bond strength between the polymeric layer 38 and the conductive layer 22 is higher than the bond strength between the conductive layer 22 and the growth substrate 26. As the conductive layer 22 is transferred from the growth substrate 26 to the device substrate 42 without any intermediate steps or films, the transfer may be said to be a direct transfer. Such a feature may be advantageous in that the growth substrate 26 does not necessarily need to be dissolved to detach the conductive layer 22. Such a feature may be advantageous in that the growth substrate 26 may be reused to form more conductive layers 22 to which the process 10 may be applied. Further, contamination from intermediate steps or films may be eliminated.

The process 10 (e.g., upon completion of step 70) results in the functionalized device substrate 14. As explained above, the functionalized device substrate 14 may be a component of a mobile communication device (e.g., a cellular phone), an augmented reality device, an instrument, a vehicle, a display and/or other electronic components. For example, as the functionalized device substrate 14 includes the conductive layer 22 on the device substrate 42 (e.g., glass), the functionalized device substrate 14 may be a component within a touchscreen display. In another example, as the conductive layer 22 has high electrical conductivity and is very thin, the functionalized device substrate 14 may be a component of a high-speed transistor and/or energy/thermal management device of a computing system (e.g., mobile or stationary).

Due to the processing parameters of the process outlined in the disclosure (e.g., process 10), the conductive layer 22 of the functionalized device substrate 14 may provide a variety of beneficial advantages. For example, the conductive layer 22 may have a sheet resistance of from about 100 Ohm/sq to about 30 kOhm/sq, from about 100 Ohm/sq to about 24 kOhm/sq, from about 100 Ohm/sq to about 10 kOhm/sq, from about 100 Ohm/sq to about 5.0 kOhm/sq as measured using a collinear four-point measuring technique utilizing gold contact pads. For example, the conductive layer 22 may have a sheet resistance of about 100 Ohm/sq, 200 Ohm/sq, 300 Ohm/sq, 400 Ohm/sq, 500 Ohm/sq, 600 Ohm/sq, 700 Ohm/sq, 800 Ohm/sq, 900 Ohm/sq, 1.0 kOhm/sq, 2.0 kOhm/sq, 3.0 kOhm/sq, 4.0 kOhm/sq, 5.0 kOhm/sq, 6.0 kOhm/sq, 7.0 kOhm/sq, 8.0 kOhm/sq, 9.0 kOhm/sq, 10 kOhm/sq, 11 kOhm/sq, 12 kOhm/sq, 13 kOhm/sq, 14 kOhm/sq, 15 kOhm/sq, 16 kOhm/sq, 17 kOhm/sq, 18 kOhm/sq, 19 kOhm/sq, 20 kOhm/sq, 21 kOhm/sq, 22 kOhm/sq, 23 kOhm/sq, 24 kOhm/sq, 25 kOhm/sq, 26 kOhm/sq, 27 kOhm/sq, 28 kOhm/sq, 29 kOhm/sq, 30 kOhm/sq and all sheet resistance values therebetween. The low sheet resistance of the conductive layer 22 may be achieved because the surface of the conductive layer 22 exposed by the separation of the growth substrate 26 is uncontaminated by intermediate polymeric sheets used by conventional thin film manufacturing processes.

Use of the present disclosure may offer a variety of advantages. First, by allowing the conductive layer 22 to be transferred from the growth substrate 26 directly to the device substrate 42 via the polymeric layer 38, intermediate substrate steps may be eliminated from the process 10. Elimination of intermediate support substrates may reduce or eliminate costs associated with manufacturing and production. With the elimination of intermediate support layers, the process 10 may be referred to as a direct transfer of the conductive layer 22 between the growth substrate 26 and the device substrate 42. Second, as the exposed side of the conductive layer 22 is uncontacted by any intermediate layers, contamination and/or defects generated by intermediate support layers may not occur. Such elimination of contamination may serve to increase the electrical conductivity of the conductive layer 22. Third, as the growth substrate 26 is peeled from the conductive layer 22 in one piece, the growth substrate 26 may be reused as a growth substrate 26. Further, as the growth substrate 26 is not dissolved or damaged, as compared to conventional designs, the costs associated with creating new growth substrates 26 may be reduced or eliminated.

EXAMPLES

The following examples represent certain non-limiting examples of the conductive layer 22 and the process 10 of this disclosure.

In a first example of the disclosure, a monolayer graphene layer (e.g., the conductive layer 22) was transferred onto a glass substrate (e.g., the device substrate 42) by the following steps: (1) the glass substrate is cleaned and hydroxylated; (2) the clean glass substrate is functionalized with aminopropyltriethoxysilane (APTES) (e.g., the coupling agent 46) by exposure to APTES vapor at 70° C. for 1 hour under vacuum; (3) polyamic acid (PAA) from Sigma-Aldrich was spin coated on the APTES-functionalized glass substrate at 4500 rpm for 30 seconds; (4) the PAA coating was partially cured at 150° C. in an air-vented oven for 10 minutes; (5) a graphene on copper foil sheet is placed on the coated glass substrate and overlaid with Teflon and silicone sheets; (6) the coper foil/graphene and PAA/glass substrate combination is brought to 150° C. and pressed at 180 psi for 10 minutes; and (7) the copper foil is peeled off to leave the graphene film on the glass substrate.

In a second example, a monolayer graphene layer is transferred onto a glass substrate by the following steps: (1) the glass substrate is cleaned and hydroxylated; (2) 0.3 g APTES is added to 40 ml PAA from Sigma-Aldrich and mixed well; (3) the PAA and APTES mixture is spin coated on the clean glass substrate at 4500 rpm for 30 seconds; (4) the PAA and APTES mixture is partially cured at 150° C. in an air-vented oven for 10 minutes; (5) a graphene on copper foil sheet is place on the coated glass substrate and overlaid with Teflon and silicone sheets; (6) the coper foil/graphene and PAA/glass substrate combination is brought to 150° C. and pressed at 180 psi for 10 minutes; (7) the copper foil is peeled off to leave the graphene film on the glass substrate.

Figure 2A:
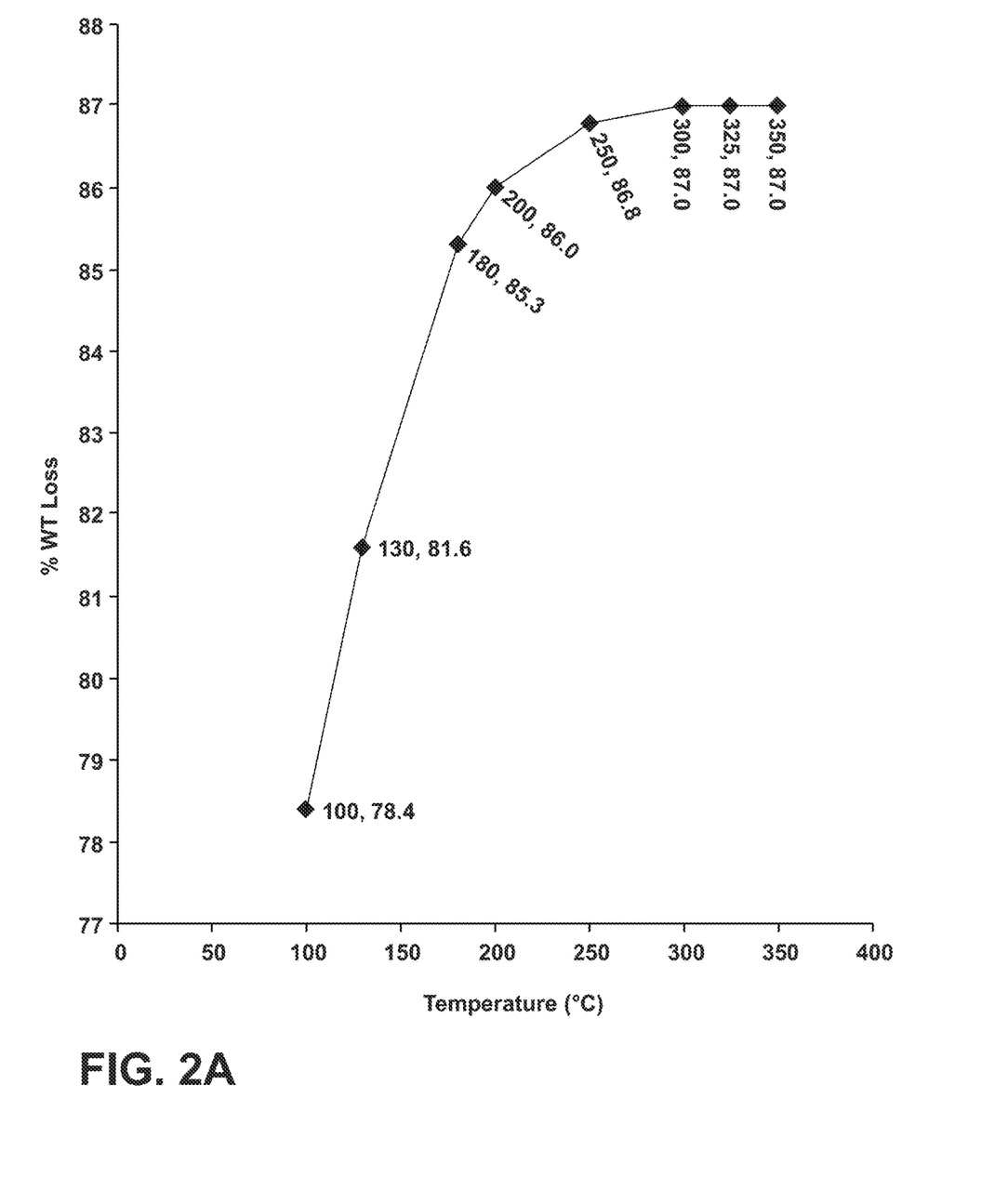
FIG. 2A is a plot of mass loss vs. temperature for polyimide after 10 minutes illustrating the curing temperature of the polyimide.

Referring now to FIG. 2A, depicted is a mass loss, or gravimetric, plot of a polyimide material (e.g., the polymeric layer 38) sold under the brand VTEC™ cured for 10 minutes at different temperatures. The gravimetric study provides the volatility rate and percentage of the solvent remaining in the polyimide film such that defects associated with trapped solvent during the transfer process of graphene (e.g., the conductive layer 22) may be eliminated. The average percent weight loss at full cure is 87.0% which occurred at 300° C., 325° C., and 350° C. At 250° C. the average value was 86.8% giving reference that full cure is achieved between 250° C. and 300° C. The imidization process of VTEC™ polyimide is from about 82.0% (100% solvent loss) and full cure at 87% and represents approximately 5.7% of the total weight lost. The fully cured polyimide material represents 13% of the original weight of VTEC™ spin-coated on a glass substrate (e.g., the device substrate 42) at 1000 rpm for 60 seconds.

Figure 2B:
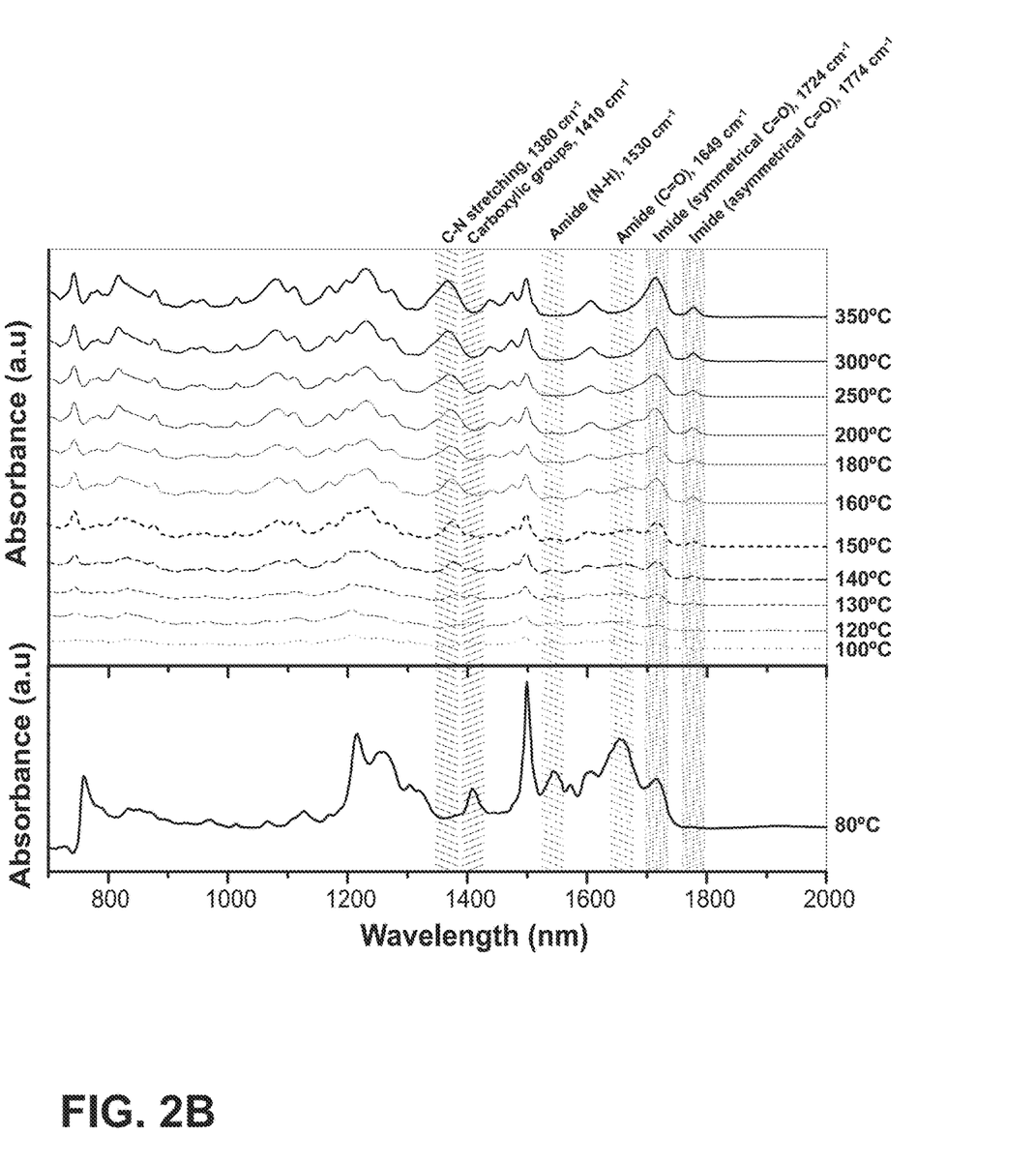
FIG. 2B is a plot of Fourier-transform infrared spectroscopy (FT-IR) data for polyimide samples heated for 10 minutes at a variety of temperatures.

Referring now to FIG. 2B, depicted is a plot of Fourier-transform infrared spectroscopy (FT-IR) data. The FT-IR data, in conjunction with the gravimetric data, was used to obtain a visual metric of the imidization progression during each stage of weight loss, and to help identify working parameters for drying and transfer procedures (e.g., for the process 10). As can be seen in FIG. 2B, comparing the imide absorption bands near 1780 cm$^{-1}$, 1720 cm$^{-1}$ and 1380 cm$^{-1}$, and the amide absorption bands near 1650 cm$^{-1}$ and 1540 cm$^{-1}$ gives a general indication of the percentage cure of the polyimide material. FT-IR spectra taken following a 100° C. cure for 10 minutes demonstrates a minimal to no absorption band at 1780 cm$^{-1}$ and 1720 cm$^{-1}$ (C=O stretching) and 1380 cm$^{-1}$ (C—N stretching) and all three appear at 130° C. for a 10 minute cure. Between 130° C. for 10 minutes and 180° C. for 10 minutes, advancement of the imidization process is well observed with increasing intensities at 1776 cm$^{-1}$, 1714 cm$^{-1}$ and 1371 cm$^{-1}$. Finally, the sample taken after 250° C. for 10 minutes demonstrates an almost fully cured film observing the same absorption bands at 1777 cm$^{-1}$, 1712 cm$^{-1}$, and 1369 cm$^{-1}$. The FT-IR data, in addition to the gravimetric data, allows the time and temperature of the curing process (e.g., step 54) of the polyimide material to be determined such that appropriate transfer parameters are achieved.

Figure 3A:
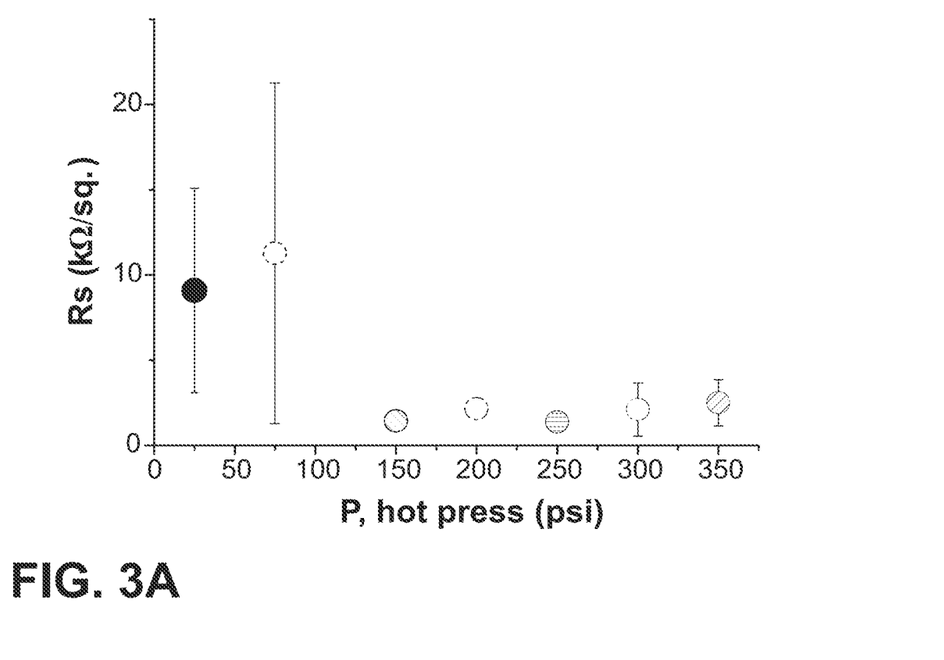
FIG. 3A is a plot of sheet resistance vs. pressure for graphene layers pressed against polyimide.
Figure 3B:
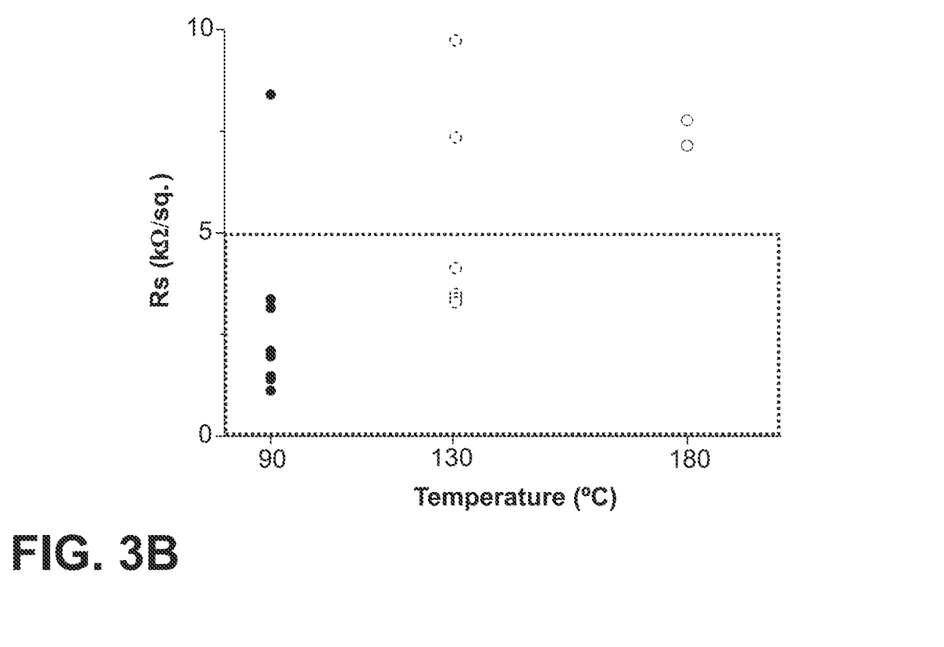
FIG. 3B is a plot of sheet resistance vs. curing temperature for graphene layers pressed against polyimide while heated.
Figure 3C:
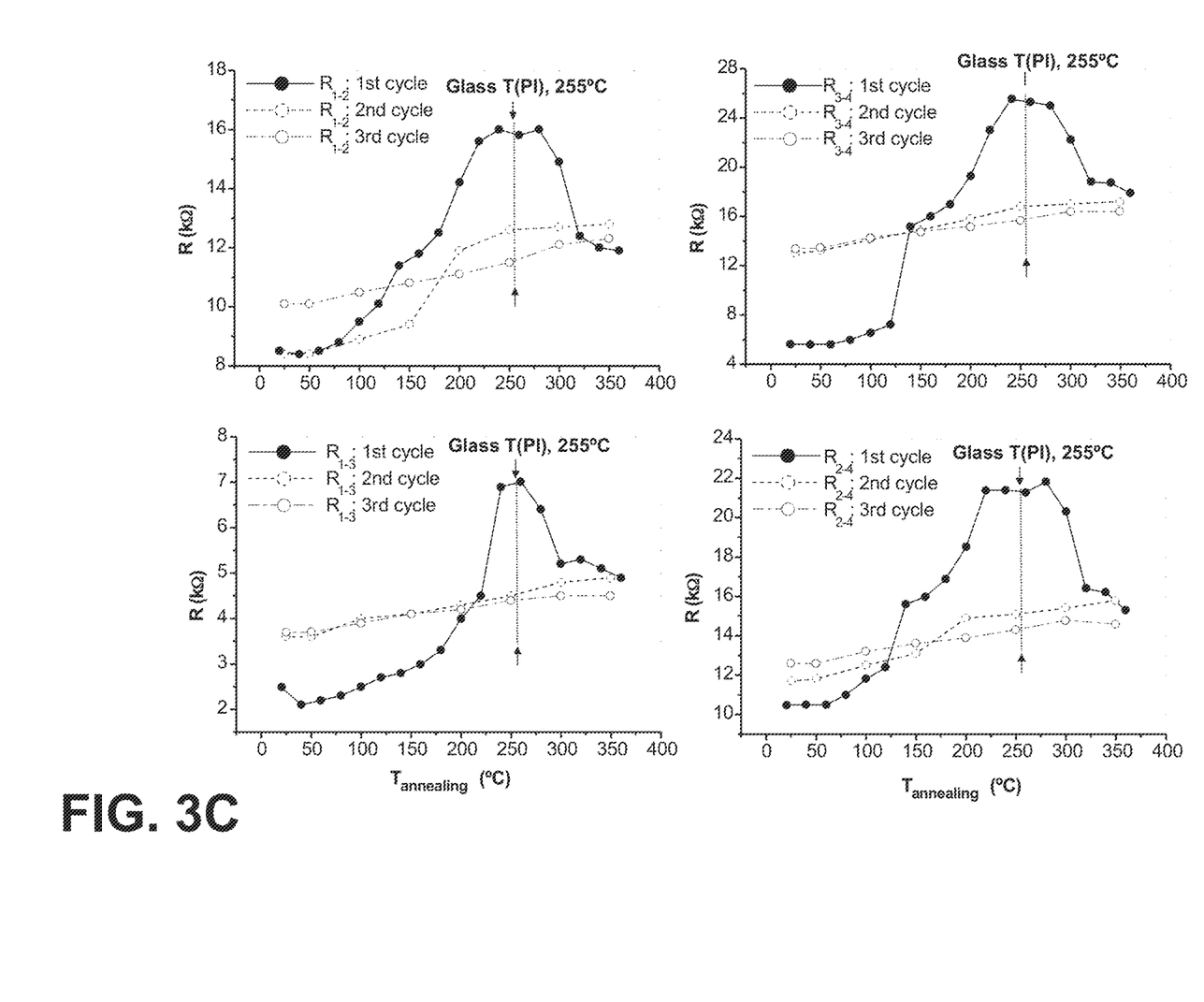
FIG. 3C is a plot of resistance vs. annealing temperature for graphene layers previously transferred to a substrate.

Referring now to FIGS. 3A-3C, in order to optimize the transfer procedure (e.g., the process 10), the temperature and pressure parameters were modified to evaluate their impact on graphene layer (e.g., the conductive layer 22) quality and electrical properties. Pressure during a hot press step (e.g., step 54A) was modified between about 25 psi and about 350 psi (FIG. 3A) for both aminosilane (e.g., the coupling agent 46) mixed into the VTEC™ (e.g., step 34A) and where the aminosilane was laid down as a separate layer from the VTEC™ (e.g., step 34B). High sheet resistance (Rs) values were obtained at lower pressures (e.g., about 25 psi to about 75 psi) possibly because a poor contact between the graphene layer and a substrate (e.g., the polymeric layer 38), while low and consistent sheet resistance values were obtained at a pressure of greater than or equal to about 150 psi. As shown in FIG. 3A, the sheet resistance of seven samples of graphene layers formed on a smooth 18 μm Cu foil (e.g., the growth substrate 26), were measured after hot pressing to the VTEC™ between about 25 psi and about 350 psi. The sheet resistance is high for both processes between about 25 psi and about 75 psi with a large error bar possibly because of a poor contact between the graphene and VTEC™. For pressures of about 150 psi to about 350 psi, the sheet resistance is consistent, thus confirming that after good adhesion is obtained, the pressure will not affect the graphene layer (e.g., the pressure applied will not induce voids/cracks to the graphene at higher pressures).

The second parameter varied was the temperature of the curing. As shown in FIG. 3B, the sheet resistance values for a graphene layer (e.g., the conductive layer 22) transferred to a VTEC™ polyimide material (e.g., the polymeric layer 38) following a formation procedure (e.g., the process 10) at different formation temperatures (e.g., the curing temperature of step 54) are provided. Sheet resistance values provided herein were measured using a collinear four-point measuring technique utilizing gold contact pads. As can be seen, the graphene transferred for curing temperatures of from about 90° C. to about 130° C. exhibit a sheet resistance of from about 2.1 kOhm/sq to about 9 kOhm/sq. At temperatures greater than or equal to about 180° C., the graphene transfer is challenging shown by the sheet resistance increasing to the range of kOhm-MOhms. It is believed that the increase in sheet resistance is at least partially due to the curing state of the polyimide material. As the curing temperature increases, and therefore the solvent content of the polyimide material decreases (as shown in FIGS. 2A and 2B), the adhesion between the graphene layer and the polyimide material decreases. As such, higher sheet resistance values may occur due to less graphene being transferred and/or the graphene transferred having a greater quantity of defects. In other words, the variability in graphene conductivity observed may be due to the polyimide imidization as the higher temperatures promote further imidization of the polyimide, which at the same time, and possibly because most of the chemical rings are closed, would have weaker interaction with graphene thereby leading to a decreased transfer.

Referring now to FIG. 3C, the stability of polyimide with respect to thermal annealing is evaluated when the temperature was progressively increased (180° C., 200° C., 250° C., 300° C. and 350° C.). This is to demonstrate that any high-temperature device fabrication process step will not negatively affect the properties of the structure. FIG. 3C shows the results of three cycles of temperature performed to the same sample. It was found that for the first cycle, the resistance increased until the temperature range of about 250° C. to about 300° C. when the resistance started to decrease. It is believed that the polyimide material could be shrinking (e.g., in addition to the graphene) when increasing the temperature due to imidization completion. After a glass transition of the polyimide material is achieved (e.g., at a glass transition temperature of about 255° C.), the sheet resistance starts to decrease as the stiffness of the polyimide film is reduced, and consequently, also the graphene attached to it. It can be observed that when the sample was heated again to high temperatures in the second and third cycle, resistance increased in a progressive way but almost keeping its value for both cycles.

Figure 4A:
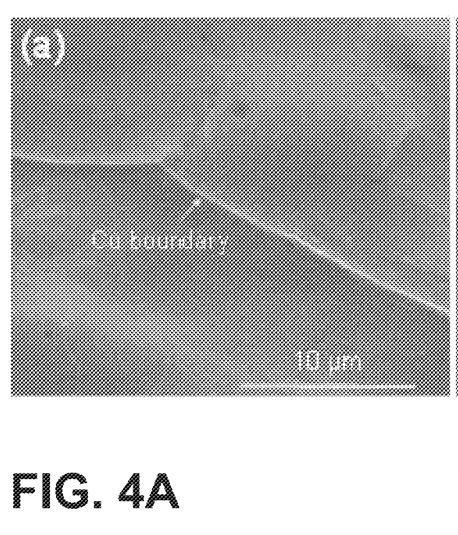
FIG. 4A is a scanning electron microscope image of a graphene layer after transfer to a substrate.
Figure 4B:
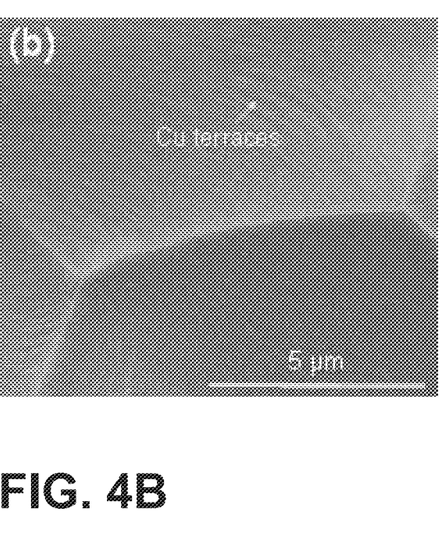
FIG. 4B is a scanning electron microscope image of a graphene layer on a substrate.
Figure 4C:
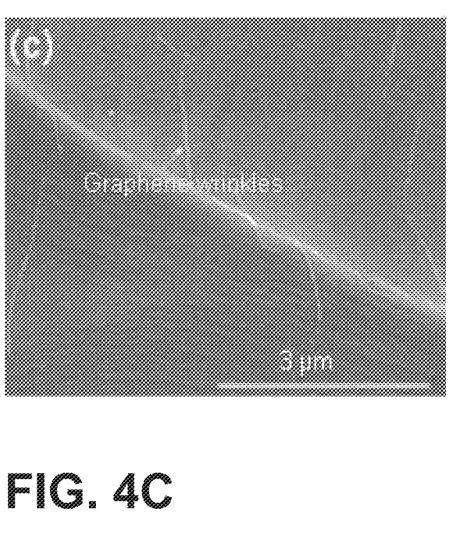
FIG. 4C is a scanning electron microscope image of a graphene layer on a substrate.

Referring now to FIGS. 4A-4C, scanning electron microscope characterization was performed demonstrating the transfer of a clean and continuous layer of graphene from a copper substrate using the VTEC™ polyimide material (e.g., the polymeric layer 38). Grain boundaries of the copper substrate (e.g., the growth substrate 26) on which the graphene layer was grown can be observed demonstrating that features of the copper microstructure are imprinted on the polyimide/graphene structure. Copper grain boundaries and copper terraces can be distinguished because of their imprint on the polyimide. Furthermore, graphene is demonstrated to be continuous and clean, with only some observable wrinkles. The fact that microstructural characteristics from the copper substrate transfer to the graphene suggest that the use of the polyimide material results in a graphene layer which is as pristine as possible.

Figure 5A:
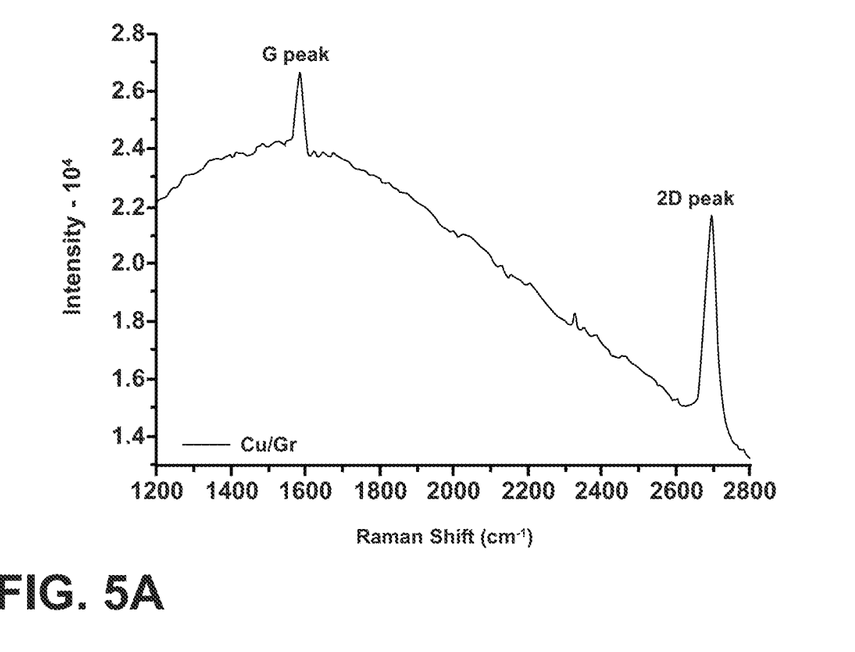
FIG. 5A is a Raman spectroscopy plot of a graphene layer on copper foil.
Figure 5B:
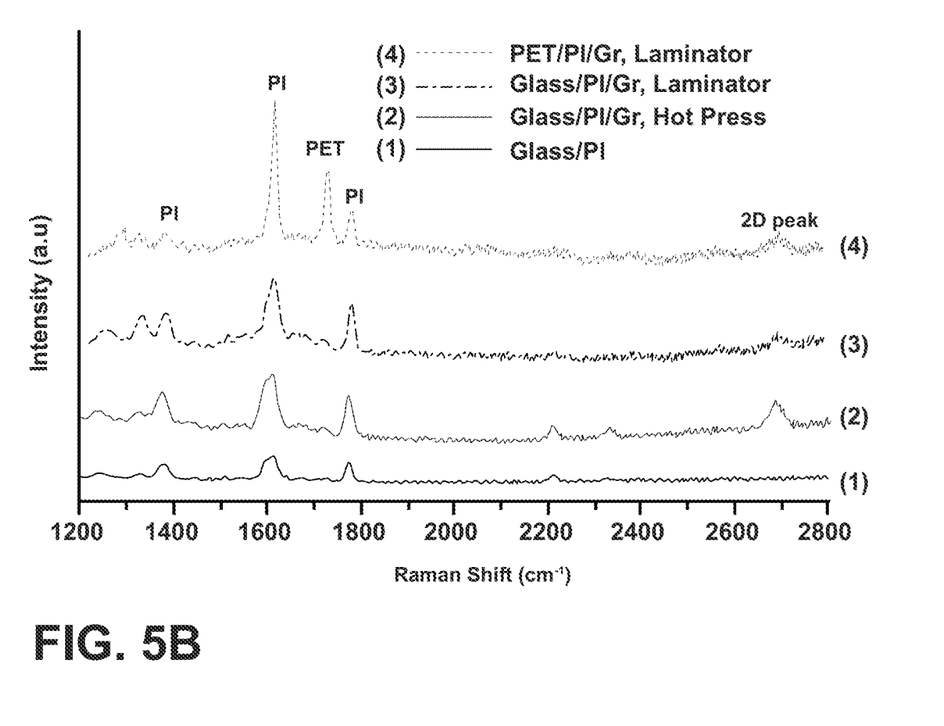
FIG. 5B is a plot of Ramen spectroscopy for a variety of samples.

Referring now to FIGS. 5A and 5B, Raman characterization was performed in order to demonstrate the presence of graphene on a VTEC™ material after peeling the graphene from a substrate the graphene was grown on. As can be seen from the plot, polyimide peaks are detected with an additional small 2D peak at 2700 $cm^{-1}$ which corresponds to graphene. FIG. 5A corresponds to Graphene on Copper which shows the characteristic 2D peak at 2680 $cm^{-1}$ and G peak at 158 $cm^{-1}$. Plot 1 of FIG. 5B corresponds to polyimide on glass which also shows polyimide's characteristic peaks at 1377, 1608 and 1775 $cm^{-1}$. Plots 2-4 of FIG. 5B correspond to graphene transferred by the above-described process using various substrates, types of graphene and transfer steps. Specifically, plot 2 corresponds to graphene transferred to polyimide on glass by hot press, plot 3 corresponds to graphene transferred to polyimide on glass by a laminator, and plot 4 corresponds to graphene transferred to polyimide on polyethylene terephthalate (PET) by a laminator. As such, the transfer of the graphene to the polyimide material is confirmed from the presence of 2D peaks on all these samples.

Referring now to Table 1, provided are electrical properties of two samples prepared consistent with the present disclosure.

TABLE 1

|  | Sheet Resistance ($\Omega$/sq) | Mobility ($cm^2/V \cdot s$) | Carrier Density ($cm^{-2}$) |
| --- | --- | --- | --- |
| Sample 1 | 490 | 6126 | 2.082E+12 |
| Sample 2 | 550 | 6209 | 1.83E+12 |

Sample 1 and Sample 2 were prepared by spin coating VTEC™ (e.g., the polymeric layer 38) mixed with an aminosilane (e.g., the coupling agent 46) at about 400 rpm to about 500 rpm on a cleaned wafer of Corning® Eagle® glass (e.g., the device substrate 42). Samples 1 and 2 were then baked at 150° C. for ten minutes followed by pressing a graphene (e.g., the conductive layer 22) coated copper substrate (e.g., the growth substrate 26) against the samples. The graphene coated copper substrate was pressed into the VTEC™ for ten minutes at 150° C. at a pressure consistent with the present disclosure. The graphene was then peeled from the copper substrate and the electrical properties of the graphene were tested. The carrier density is the density of electrons in the graphene sheet.

Although multiple instances of data provided in the present disclosure was based on VTEC™, the method (e.g., the process 10) has been demonstrated to work for other polyimide precursors (polyamic acids) including PAA-431176 from Sigma Aldrich and PI-2610 from HD Microsystems, obtaining comparable values of graphene coverage and electrical properties. As such, the robustness of the method has been demonstrated.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and, further, it is to be understood that such concepts are intended to be covered by the following claims, unless these claims, by their language, expressly state otherwise. Further, the claims, as set forth below, are incorporated into and constitute part of this Detailed Description.

What is claimed is:

1. A functionalized device substrate, comprising:
a substrate defining a surface;
a polyimide layer disposed over the surface of the substrate, wherein an aminosilane couples the polyimide layer to the surface; and
a graphene layer coupled to the polyimide layer, wherein the graphene layer has a sheet resistance of from about 100 Ohm/sq to about 600 Ohm/sq.

2. The device substrate of claim 1, wherein the substrate comprises at least one of a silicon wafer, a polymeric material, a glass, a glass-ceramic and a ceramic.

3. The device substrate of claim 1, wherein the aminosilane is dispersed within the polyimide layer, as derived from about 0.1 wt. % to 10 wt. % aminosilane in a precursor mixture of a polyimide and a solvent.

4. The device substrate of claim 1, wherein the aminosilane is an aminosilane layer.

5. A functionalized device substrate, comprising:
a substrate defining a surface;
a polyimide layer disposed over the surface of the substrate, wherein an aminosilane couples the polyimide layer to the surface; and
a graphene layer coupled to the polyimide layer, wherein the graphene layer has a sheet resistance of from about 100 Ohm/sq to about 600 Ohm/sq, and wherein the graphene layer is as-pressed against the polyimide layer at a pressure of from about 150 psi to about 350 psi.

6. The device substrate of claim 5, wherein the substrate comprises at least one of a silicon wafer, a polymeric material, a glass, a glass-ceramic and a ceramic.

7. The device substrate of claim 5, wherein the aminosilane is dispersed within the polyimide layer, as derived from about 0.1 wt. % to 10 wt. % aminosilane in a precursor mixture of a polyimide and a solvent.

8. The device substrate of claim 5, wherein the aminosilane is an aminosilane layer.

9. The device substrate of claim 5, wherein the graphene layer is pressed against the polyimide layer at a temperature of from about 50° C. to about 200° C.

10. The device substrate of claim 5, wherein the graphene layer is pressed against the polyimide layer at a temperature of from about 129° C. to about 190° C.

11. A functionalized device substrate, comprising:
a substrate defining a surface;
a polymer layer disposed over the surface of the substrate, wherein an aminosilane couples the polymer layer to the surface; and
a graphene layer coupled to the polymer layer, wherein the graphene layer has a sheet resistance of from about 100 Ohm/sq to about 600 Ohm/sq, and further wherein the polymer layer is composed of a polyimide or a polythiophene.

12. The device substrate of claim 11, wherein the substrate comprises at least one of a silicon wafer, a polymeric material, a glass, a glass-ceramic and a ceramic.

13. The device substrate of claim 11, wherein the aminosilane is dispersed within the polymer layer, as derived from about 0.1 wt. % to 10 wt. % aminosilane in a precursor mixture of a polyimide and a solvent.

14. The device substrate of claim 11, wherein the aminosilane is an aminosilane layer.

15. The device substrate of claim 11, wherein the graphene layer has a sheet resistance of from about 100 Ohm/sq to about 400 Ohm/sq.

16. The device substrate of claim 1, wherein the graphene layer has a sheet resistance of from about 100 Ohm/sq to about 400 Ohm/sq.

17. The device substrate of claim 5, wherein the graphene layer has a sheet resistance of from about 100 Ohm/sq to about 400 Ohm/sq.

* * * * *